United States Patent Office 3,518,193
Patented June 30, 1970

3,518,193
SYNERGISTIC ANTIOXIDANT MIXTURE AND USE THEREOF
Henryk A. Cyba, Evanston, Ill., assignor to Universal Oil Products Company, Des Plaines, Ill., a corporation of Delaware
No Drawing. Continuation-in-part of applications Ser. No. 367,854, May 15, 1964, and Ser. No. 559,410, June 22, 1966, the latter application being a division of application Ser. No. 366,921, May 12, 1964. This application Mar. 6, 1968, Ser. No. 710,782
Int. Cl. C10m 1/38, 1/54
U.S. Cl. 252—46.3     18 Claims

ABSTRACT OF THE DISCLOSURE

Synergistic antioxidant mixture of a borate of N,N-dihydrocarbyl-alkanolamine or borate of polyalkyl- or polycycloalkyl- polyhydroxyalkyl-alkylenepolyamine and an N-hydroxyphenyl-benzotriazole, with or without additional antioxidants. This antioxidant mixture is used as an additive in organic substrates normally subject to oxidative deterioration.

CROSS-REFERENCE TO RELATED APPLICATIONS

This is a continuation-in-part of application Ser. No. 367,854, filed May 15, 1964, now Pat. No. 3,382,208 dated May 7, 1968; and of application Ser. No. 559,410, filed June 22, 1966, now Pat. No. 3,445,422 dated May 20, 1969, the latter application being a division of application Ser. No. 366,921, filed May 12, 1964 and now Pat. No. 3,301,888, dated Jan. 31, 1967.

The parent applications referred to above are directed primarily to the improvement of the weathering properties of a solid substrate and particularly a plastic. Plastic and other solid polymeric substrates are exposed to ultraviolet light and undergo deterioration from this source, as well as from oxidation reactions induced by such weathering. As set forth in the parent applications, borates of the N,N-dihydrocarbylalkanolamines and of the polyalkyl-polyhydroxyalkyl-alkylenepolyamines are very effective in retarding such deterioration. These additives may be used in conjunction with other additives.

DESCRIPTION OF THE INVENTION

The present invention is based on the discovery that a mixture of a borate of N,N-dihydrocarbyl-alkanolamine or of a borate of the polyalkyl- or polycycloalkyl-polyhydroxyalkyl-alkylenepolyamine and an N-hydroxyphenyl-benzotriazole produces a synergistic composition of outstanding properties, both as to retarding ultraviolet light deterioration and oxidative deterioration. This synergistic mixture accordingly is of advantage for use in any organic substrate which undergoes deterioration due to weathering.

In one embodiment the present invention relates to a synergistic mixture of a borate of N,N-dihydrocarbyl-alkanolamine and an N-hydroxphenyl-benzotriazole.

In another embodiment the present invention relates to a synergistic mixture of a borate of a polyalkylpolyhydroxyalkyl-alkylenepolyamine and an N-hydroxyphenyl-benzotriazole.

In still another embodiment the present invention comprises a synergistic mixture as described above also containing a minor concentration of one or more additional antioxidants.

In a specific embodiment the present invention comprises a synergistic mixture of about 10% to about 90% by weight of a borate of N,N-dihydrocarbyl-alkanolamine and about 10% to about 90% by weight of an N-hydroxyphenyl-benzotriazole, with or without about 1% to about 50% by weight of said mixture of a trialkylphenol.

In another specific embodiment the present invention comprises a synergistic mixture of about 10% to about 90% by weight of a borate of N,N'-di-sec-alkyl-N,N'-dihydroxyalkyl-ethylenediamine and about 10% to about 90% by weight of an N-hydroxyphenyl-benzotriazole, with or without about 1% to about 50% by weight of said mixture of a trialkylphenol.

In another specific embodiment the present invention comprises a synergistic mixture of a borate as herein set forth, an N-hydroxyphenyl-benzotriazole, 1,1,3-tris-(2-methyl-4-hydroxy-5-tert-butylphenyl)-butane and dilauryl-thiodipropionate.

In another embodiment, the present invention relates to a method of stabilizing an organic substrate normally subject to weathering by incorporating therein a stabilizing concentration of a synergistic mixture as herein defined.

The borate comprising a component of the synergistic mixture may be illustrated as a borate of an alkanolamine of the following formula:

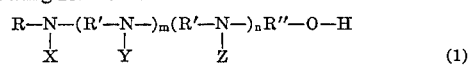

(1)

where R is hydrocarbyl, R' is alkylene, R" is alkylene, X is hydrocarbyl when $m$ and $n$ are zero or hydroxyalkyl when $m$ is one or more and/or $n$ is one, Y is hydrocarbyl when $m$ is one and $n$ is zero or hydroxyalkyl when $m$ is more than one and $n$ is one, Z is hydrocarbyl, $m$ is an integer of zero to 4 and $n$ is zero or one.

Where $m$ and $n$ are zero and X is hydrocarbyl, this component of the mixture is a borate of an N,N-dihydrocarbyl-alkanolamine. In one embodiment the hydrocarbyl is alkyl and preferably sec-alkyl containing from 3 to about 20 carbon atoms although, when desired, each alkyl group may contain up to 50 carbon atoms. Illustrative preferred alkanolamines in this embodiment include N,N-di-isopropyl-ethanolamine, N,N-di-sec-butylethanolamine, N,N-di-sec-pentyl-ethanolamine, N,N-di-sec-hexyl-ethanolamine, N,N-di-sec-heptyl-ethanolamine, N,N-di-sec-octyl-ethanolamine, N,N-di-sec-nonyl-ethanolamine, N,N-di-sec-decyl-ethanolamine, N,N-di-sec-undecyl-ethanolamine, N,N-di-sec-dodecyl - ethanolamine, N,N-di-sec-tridecyl-ethanolamine, N,N-di-sec-tetradecyl-ethanolamine, N,N-di-sec-pentadecyl - ethanolamine, N,N-di-sec-hexadecyl-ethanolamine, N,N-di-sec-heptadecyl-ethanolamine, N,N-di-sec-octadecyl-ethanolamine, N,N-di-sec-nonadecyl-ethanolamine, N,N-di-sec-eicosyl-ethanolamine, etc., and corresponding compounds in which the ethanolamine moiety is replaced by propanolamine or butanolamine and, when desired, by pentanolamine, hexanolamine, heptanolamine, octanolamine, etc. In general, it is preferred that the alkyl groups are the same. However, when desired, the alkyl groups may be different but both of them preferably are of secondary configuration.

In another embodiment, the borate of the N,N-dihydrocarbyl-alkanolamine is a borate of N,N-dicycloalkyl-alkanolamine. A particularly preferred alkanolamine in this embodiment is N,N-dicyclohexyl-ethanolamine. Other compounds include N,N-dicyclopropyl-ethanolamine, N,N-dicyclobutyl-ethanolamine, N,N-dicyclopentyl-ethanolamine, N,N - dicycloheptyl-ethanolamine, N,N - dicyclooctyl-ethanolamine, N,N-dicyclononyl-ethanolamine, N,N-dicyclodecyl-ethanolamine, N,N - dicycloundecyl - ethanolamine, N,N-dicyclododecyl-ethanolamine, etc., and similarly substituted compounds in which the ethanolamine moiety is replaced by an alkanolamine group containing from 3 to about 8 carbon atoms.

In another embodiment the N,N-dihydrocarbyl-alkanolamine may contain one sec-alkyl group and one cycloalkyl group as, for example, in compounds as N-isopropyl-N-cyclohexyl-ethanolamine, N-sec-butyl - N - cyclohexyl-ethanolamine, N-sec-pentyl-N-cyclohexyl-ethanolamine, N-sec-hexyl-N-cyclohexyl-ethanolamine, N-sec-heptyl-N-cyclohexyl-ethanolamine, N-sec-octyl-N-cyclohexyl-ethanolamine, etc., and corresponding compounds in which the ethanolamine moiety is replaced by an alkanolamine moiety of from 3 to about 8 carbon atoms.

The N,N-dihydrocarbyl-alkanolamine for use in the present invention may be obtained from any suitable source or may be prepared in any suitable manner. Details of the preparation of these compounds are set forth in the parent application and are embodied herein as part of the present specifications.

Where $n$ and/or $m$ in the above formula are one or more, this component of the mixture is a borate of a particular polyalkyl- or polycycloalkyl polyhydroxyalkyl-alkylenepolyamine which aso may be named as an alkanolamine. In this embodiment X is hydroxyalkyl, Y is hydrocarbyl when $n$ is zero or hydroxyalkyl when $n$ is one, and Z is hydrocarbyl.

Referring to the above formula, where $m$ is zero and $n$ is one, the compound is an N,N'-dialkyl-N-hydroxyalkylaminoalkyl-alkanolamine, which also may be named N,N'-dialkyl-N,N'-dihydroxyalkyl-ethylenediamine. The alkyl groups preferably are secondary alkyl groups and contain from 4 to about 50 carbon atoms each and more particularly from 4 to 20 carbon atoms each. Illustrative preferred compounds in this embodiment include N,N-di-sec-butyl-N-hydroxyethyl-aminoethyl-ethanolamine,
N,N'-di-sec-pentyl-N-hydroxyethyl-aminoethyl-ethanolamine,
N,N'-di-sec-hexyl-N-hydroxyethyl-aminoethyl-ethanolamine,
N,N'-di-sec-heptyl-N-hydroxyethyl-aminoethyl-ethanolamine,
N,N'-di-sec-octyl-N-hydroxyethyl-aminoethyl-ethanolamine,
N,N'-di-sec-nonyl-N-hydroxyethyl-aminoethyl-ethanolamine,
N,N'-di-sec-decyl-N-hydroxyethyl-aminoethyl-ethanolamine,
N,N'-di-sec-undecyl-N-hydroxyethyl-aminoethyl-ethanolamine,
N,N'-di-sec-dodecyl-N-hydroxyethyl-aminoethyl-ethanolamine,
N,N'-di-sec-tridecyl-N-hydroxyethyl-aminoethyl-ethanolamine,
N,N'-di-sec-tetradecyl-N-hydroxyethyl-aminoethyl-ethanolamine,
N,N'-di-sec-pentadecyl-N-hydroxyethyl-aminoethyl-ethanolamine,
N,N'-di-sec-hexadecyl-N-hydroxyethyl-aminoethyl-ethanolamine,
N,N'-di-sec-heptadecyl-N-hydroxyethyl-aminoethyl-ethanolamine,
N,N'-di-sec-octadecyl-N-hydroxyethyl-aminoethyl-ethanolamine,
N,N'-di-sec-nonadecyl-N-hydroxyethyl-aminoethyl-ethanolamine,
N,N'-di-sec-eicosyl-N-hydroxyethyl-aminoethyl-ethanolamine, etc.

The above compounds are illustrative of compounds in which R' and R'' each contain two carbon atoms. It is understood that corresponding compounds are included in which one or both of the groups containing two carbon atoms are replaced by a group containing 3, 4, 5 or 6 carbon atoms.

Referring again to the above formula, where $m$ and $n$ are one, the compounds for use in preparing the borate named N,N-bis-[N-alkyl-N-(hydroxyalkyl)-aminoalkyl]-alkanolamine which also can be named $N^1,N^3$-dialkyl-$N^1,N^2,N^3$-tri-(hydroxyalkyl)-diethylenetriamine. It will be noted that each terminal nitrogen contains an alkyl group and each nitrogen atom contains a hydroxyalkyl group attached thereto. Illustrative preferred compounds in this embodiment include N,N-bis-[N-sec-butyl-N-(2-hydroxyethyl)-aminoethyl]-ethanolamine,
N,N-bis-[N-sec-pentyl-N-(2-hydroxyethyl)-aminoethyl]-ethanolamine,
N,N-bis-[N-sec-hexyl-N-(2-hydroxyethyl-aminoethyl]-ethanolamine,
N,N-bis-[N-sec-heptyl-N-(2-hydroxyethyl)-aminoethyl]-ethanolamine,
N,N-bis-[N-sec-octyl-N-(2-hydroxyethyl)-aminoethyl]-ethanolamine,
N,N-bis-[N-sec-nonyl-N-(2-hydroxyethyl)-aminoethyl]-ethanolamine,
N,N-bis-[N-sec-decyl-N-(2-hydroxyethyl)-aminoethyl]-ethanolamine,
N,N-bis-[N-sec-undecyl-N-(2-hydroxyethyl)-aminoethyl]-ethanolamine,
N,N-bis-[N-sec-dodecyl-N-(2-hydroxyethyl)-aminoethyl]-ethanolamine,
N,N-bis-[N-sec-tridecyl-N-(2-hydroxyethyl)-aminoethyl]-ethanolamine,
N,N-bis-[N-sec-tetradecyl-N-(2-hydroxyethyl)-aminoethyl]-ethanolamine,
N,N-bis-[N-sec-pentadecyl-N-(2-hydroxyethyl)-aminoethyl]-ethanolamine,
N,N-bis-[N-sec-hexadecyl-N-(2-hydroxyethyl)-aminoethyl]-ethanolamine,
N,N-bis-[N-sec-heptadecyl-N-(2-hydroxyethyl)-aminoethyl]-ethanolamine,
N,N-bis-[N-sec-octadecyl-N-(2-hydroxyethyl)-aminoethyl]-ethanolamine,
N,N-bis-[N-sec-nonadecyl-N-(2-hydroxyethyl)-aminoethyl]-ethanolamine,
N,N-bis-[N-sec-eicosyl-N-(2-hydroxyethyl)aminoethyl]-ethanolamine, etc.

Here again, one or both of the groups containing two carbon atoms may be replaced by a group containing 3, 4, 5 or 6 carbon atoms.

Where $m$ is two and $n$ is one, the compound is an $N^1,N^4$-dialkyl - $N^1,N^2,N^3,N^4$ - tetrahydroxyalkyl-alkylenepolyamine. Illustrative compounds in this embodiment include $N^1,N^4$-di-sec-butyl-$N^1,N^2,N^3,N^4$-tetra(2-hydroxyethyl)-triethylenetetramine,
$N^1,N^4$-di-sec-pentyl-$N^1,N^2,N^3,N^4$-tetra-(2-hydroxyethyl)-triethylenetetramine,
$N^1,N^4$-di-sec-hexyl-$N^1,N^2,N^3,N^4$-tetra-(2-hydroxyethyl)-triethylenetetramine,
$N^1,N^4$-di-sec-heptyl-$N^1,N^2,N^3,N^4$-tetra-(2-hydroxyethyl)-triethylenetetramine,
$N^1,N^4$-di-sec-octyl-$N^1,N^2,N^3,N^4$-tetra--(2-hydroxyethyl-triethylenetetramine,
$N^1,N^4$-di-sec-nonyl-$N^1,N^2,N^3,N^4$-tetra-(2-hydroxyethyl)-triethylenetetramine,
$N^1,N^4$-di-sec-decyl-$N^1,N^2,N^3,N^4$-tetra-(2-hydroxyethyl)-triethylenetetramine,
$N^1,N^4$-di-sec-undecyl-$N^1,N^2,N^3,N^4$-tetra-(2-hydroxyethyl)-triethylenetetramine,
$N^1,N^4$-di-sec-dodecyl-$N^1,N^2,N^3,N^4$-tetra-(2-hydroxyethyl)-triethylenetetramine,
$N^1,N^4$-di-sec-tridecyl-$N^1,N^2,N^3,N^4$-tetra-(2-hydroxyethyl)-triethylenetetramine,
$N^1,N^4$-di-sec-tetradecyl-$N^1,N^2,N^3,N^4$-tetra-(2-hydroxyethyl-triethylenetetramine,
$N^1,N^4$-di-sec-pentadecyl-$N^1,N^2,N^3,N^4$-tetra-(2-hydroxyethyl)-triethylenetetramine,
$N^1,N^4$-di-sec-hexadecyl-$N^1,N^2,N^3,N^4$-tetra-(2-hydroxyethyl)-triethylenetetramine,
$N^1,N^4$-di-sec-heptadecyl-$N^1,N^2,N^3,N^4$-tetra-(2-hydroxyethyl)-triethylenetetramine,
$N^1,N^4$-di-sec-octadecyl-$N^1,N^2,N^3,N^4$-tetra-(2-hydroxyethyl)-triethylenetetramine, $N^1,N^4$-di-sec-nonadecyl-$N^1,N^2,N^3,N^4$-tetra-(2-hydroxyethyl)-$N^1,N^4$-di-sec-eicosyl-$N^1,N^2,N^3,N^4$-tetra-(2-hydroxyethyl)-triethylenetetramine, etc.

Here again, it is understood that one or both of the groups containing two carbon atoms may be replaced by a group containing 3, 4, 5 or 6 carbon atoms.

Referring again to the above formula, where $m$ is 3 and $n$ is 1, the compound will be $N^1,N^5$-dialkyl-$N^1,N^2,N^3,N^4,N^5$ - penta-(hydroxyalkyl) - alkylenepolyamine. Illustrative preferred compounds in this embodiment include $N^1,N^5$-di-sec-butyl-$N^1,N^2,N^3,N^4,N^5$-penta-(2-hydroxyethyl)-tetraethylenepentamine,
$N^1,N^5$-di-sec-pentyl-$N^1,N^2,N^3,N^4,N^5$-penta-(2-hydroxyethyl)-tetraethylenepentamine,
$N^1,N^5$-di-sec-hexyl-$N^1,N^2,N^3,N^4,N^5$-penta-(2-hydroxyethyl)-tetraethylenepentamine,
$N^1,N^5$-di-sec-heptyl-$N^1,N^2,N^3,N^4,N^5$-penta-(2-hydroxyethyl)-tetraethylenepentamine,
$N^1,N^5$-di-sec-octyl-$N^1,N^2,N^3,N^4,N^5$-penta-(2-hydroxyethyl)-tetraethylenepentamine,
$N^1,N^5$-di-sec-nonyl-$N^1,N^2,N^3,N^4,N^5$-penta-(2-hydroxyethyl)-tetraethylenepentamine,
$N^1,N^5$-di-sec-decyl-$N^1,N^2,N^3,N^4,N^5$-penta-(2-hydroxyethyl)-tetraethylenepentamine,
$N^1,N^5$-di-sec-undecyl-$N^1,N^2,N^3,N^4,N^5$-penta-(2-hydroxyethyl)-tetraethylenepentamine,
$N^1,N^5$-di-sec-dodecyl-$N^1,N^2,N^3,N^4,N^5$-penta-(2-hydroxyethyl)-tetraethylenepentamine,
$N^1,N^5$-di-sec-tridecyl-$N^1,N^2,N^3,N^4,N^5$-penta-(2-hydroxyethyl)-tetraethylenepentamine,
$N^1,N^5$-di-sec-tetradecyl-$N^1,N^2,N^3,N^4,N^5$-penta-(2-hydroxyethyl)-tetraethylenepentamine,
$N^1,N^5$-di-sec-pentadecyl-$N^1,N^2,N^3,N^4,N^5$-penta-(2-hydroxyethyl)-tetraethylenepentamine,
$N^1,N^5$-di-sec-hexadecyl-$N^1,N^2,N^3,N^4,N^5$-penta-(2-hydroxyethyl)-tetraethylenepentamine,
$N^1,N^5$-di-sec-heptadecyl-$N^1,N^2,N^3,N^4,N^5$-penta-(2-hydroxyethyl)-tetraethylenepentamine,
$N^1,N^5$-di-sec-octadecyl-$N^1,N^2,N^3,N^4,N^5$-penta-(2-hydroxyethyl)-tetraethylenepentamine,
$N^1,N^5$-di-sec-nonadecyl-$N^1,N^2,N^3,N^4,N^5$-penta-(2-hydroxyethyl)-tetraethylenepentamine,
$N^1,N^5$-di-sec-eicosyl-$N^1,N^2,N^3,N^4,N^5$-penta-(2-hydroxyethyl)-tetraethylenepentamine, etc.

Here again, it is understood that one or both of the groups containing two carbon atoms may be replaced by a group containing 3, 4, 5 or 6 carbon atoms.

Referring again to the above formula, where $m$ is 4 and $n$ is 1, the compound will be $N^1,N^6$-dialkyl-$N^1,N^2,N^3,N^4,N^5,N^6$-hexa-(hydroxyalkyl) - pentaethylenehexamine. Illustrative preferred compounds in this embodiment included $N^1,N^6$-di-sec-butyl-$N^1,N^2,N^3,N^4,N^5,N^6$-hexa-(2-hydroxyethyl)-pentaethylenehexamine,
$N^1,N^6$-di-sec-pentyl-$N^1,N^2,N^3,N^4,N^5,N^6$-hexa-(2-hydroxyethyl)-pentaethylenehexamine,
$N^1,N^6$-di-sec-hexyl-$N^1,N^2,N^3,N^4,N^5,N^6$-hexa-(2-hydroxyethyl)-pentaethylenehexamine,
$N^1,N^6$-di-sec-heptyl-$N^1,N^2,N^3,N^4,N^5,N^6$-hexa-(2-hydroxyethyl)-pentaethylenehexamine,
$N^1N^6$-di-sec-octyl-$N^1,N^2,N^3,N^4,N^5,N^6$-hexa-(2-hydroxyethyl)-pentaethylenehexamine,
$N^1,N^6$-di-sec-nonyl-$N^1,N^2,N^3,N^4,N^5,N^6$-hexa-(2-hydroxyethyl)-pentaethylenehexamine,
$N^1N^6$-di-sec-decyl-$N^1,N^2,N^3,N^4,N^5,N^6$-hexa-(2-hydroxyethyl)-pentaethylenehexamine,
$N^1,N^6$-di-sec-undecyl-$N^1,N^2,N^3,N^4,N^5,N^6$-hexa-(2-hydroxyethyl)-pentaethylenehexamine,
$N^1,N^6$-di-sec-dodecyl-$N^1,N^2,N^3,N^4,N^5,N^6$-hexa-(2-hydroxyethyl)-pentaethylenehexamine,
$N^1,N^6$-di-sec-tridecyl-$N^1,N^2,N^3,N^4,N^5,N^6$-hexa-(2-hydroxyethyl)-pentaethylenehexamine,
$N^1,N^6$-di-sec-tetradecyl-$N^1,N^2,N^3,N^4,N^5,N^6$-hexa-(2-hydroxyethyl)-pentaethylenehexamine,
$N^1,N^6$-di-sec-pentadecyl-$N^1,N^2,N^3,N^4,N^5,N^6$-hexa-(2-hydroxyethyl)-pentaethylenehexamine,
$N^1,N^6$-di-sec-hexadecyl-$N^1,N^2,N^3,N^4,N^5,N^6$-hexa-(2-hydroxyethyl)-pentaethylenehexamine,
$N^1,N^6$-di-sec-heptadecyl-$N^1,N^2,N^3,N^4,N^5,N^6$-hexa-(2-hydroxyethyl)-pentaethylenehexamine,
$N^1,N^6$-di-sec-octadecyl-$N^1,N^2,N^3,N^4,N^5,N^6$-hexa-(2-hydroxyethyl)-pentaethylenehexamine,
$N^1,N^6$-di-sec-nonadecyl-$N^1,N^2,N^3,N^4,N^5,N^6$-hexa-(2-hydroxyethyl)-pentaethylenehexamine,
$N^1,N^6$-di-sec-eicosyl-$N^1,N^2,N^3,N^4,N^5,N^6$-hexa-(2-hydroxyethyl-pentaethylenehexamine, etc.

Here again, it is understood that one or both of the groups containing two carbon atoms may be replaced by a group containing 3, 4, 5 or 6 carbon atoms.

As hereinbefore set forth, in a preferred embodiment the alkyl groups attached to the terminal nitrogen atoms are secondary alkyl groups. In another embodiment, these groups may be cycloalkyl groups and particularly cyclohexyl, alkylcyclohexyl, dialkylcyclohexyl, etc., although they may comprise cyclobutyl, cyclopentyl, cycloheptyl, cyclooctyl, etc., and alkylated derivatives thereof. The cycloalkyl groups may be considered as corresponding to secondary alkyl groups. The secondary alkyl configuration is definitely preferred although, when desired, the alkyl groups attached to the terminal nitrogen atoms may be normal alkyl groups but not necessarily with equivalent results.

The polyalkyl - polyhydroxyalkyl - alkylenepolyamines for use in preparing the borate may be obtained from any suitable source or prepared in any suitable manner. Here again the parent application describes the preparation of these compounds and such preparations are embodied herein as part of the present specifications.

In another embodiment, an alcohol, including aliphatic or aromatic alcohol, or mercaptan, including aliphatic or aromatic mercaptan, is included in the reaction charge to satisfy one or two of the valences of the boron. When used, the alcohol or mercaptan generally is employed in an amount of from about 0.5 to about 2 mole proportions thereof per one mole proportion of the alkanolamine or polyalkylpolyhydroxyalkyl-alkylenepolyamine. Preferred aliphatic alcohols include methanol, ethanol, isopropanol, butanol, pentanol, hexanol, heptanol, octanol, nonanol, decanol, undecanol, dodecanol, tridecanol, pentadecanol, hexadecanol, heptadecanol, octadecanol, nonadecanol, eicosanol, etc. Preferred aromatic alcohols include phenol, cresol, xylenol, catechol, alkyl catechol, etc., or these having alkoxy or halo substituents. Preferred mercaptans include butyl mercaptan, pentyl mercaptan, hexyl mercaptan, heptyl mercaptan, octyl mercaptan, nonyl mercaptan, decyl mercaptan, undecyl mercaptan, dodecyl mercaptan, etc., and thiophenol, thiocresol, thioxylenol, etc.

The borate for use in the present invention is prepared in any suitable manner and generally by reacting the alkanolamine or polyalkylpolyhydroxyalkyl - alkylenepolyamine with a suitable borating agent in the presence of a solvent at a temperature of from about 60° to about 100° C. or up to about 200° C. Here again, the details of the reaction and the discussion of the borylating agents are disclosed in the parent applications and embodied herein as part of the present specifications.

The exact structure of the borated product will vary with the particular alkanolamine and borylating agent employed, as well as with the proportions of the reactants and, when used, the extraneous alcohol or mercaptan. For example, when reacting three mole proportions of N,N-dicyclohexyl-ethanolamine with one mole proportion of boric acid, it is believed that the triester is formed in which all valences of the boron are satisfied by the N,N-di-cyclohexylaminoethoxy radical formed by the liberation of water. When equal mole proportions of N,N-di-cyclohexyl-ethanolamine and boric acid are reacted at a higher temperature, the metaborate or its trimer (boroxime) is formed. When the reaction is effected using an extraneous alcohol or mercaptan in addition to the alkanolamine, the resulting borate will be a mixed borate in which one or two of the valences of the boron are satisfied by the alkanolamine and the remaining valence or valences of the boron are satisfied by the alcohol, mercaptan, phenol or catechol derivative. When employing a trialkyl borate as the borylating agent, either complete or partial transesterification occurs depending upon the proportions of reactants and conditions of operation.

Similarly, when the polyalkyl-polyhydroxyalkyl-alkylenepolyamine is a polyalkyl-polyhydroxyalkyl-ethylenediamine, probable compounds may include one or more of the following as monomer or as recurring units:

(1)
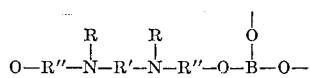

configuration in which each of the oxygens of the hydroxyl group are attached to a boron atom and the third valence is otherwise satisfied, (3) a polycyclic structure similar to that described in (2) joined by the

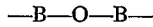

linkage, (4) compound in which each of the hydrogens of the hydroxyl groups are replaced with a

(5) compounds having boroxine configuration and (6) metaborates.

From the above discussion, it will be seen that the exact structure of the borate may vary and also that the product may consist of a mixture of compounds. Accordingly, this component of the synergistic mixture of the present invention is being claimed generically by its method of manufacture. It is understood that the different borated compounds meeting the requirements as hereinbefore set forth may be used for the purposes of the present invention, but that these different compounds are not necessary equivalent in their effectiveness in the same or different substrate.

Reference to borate in the present specification and claims is intended as generic to include boron esters or more specifically boron acid esters. This appears to be the present practice in the industry and literature. For example, alkyl boric acid or alkyl borate is used to describe a compound of the formula $(HO)_2$—B—R or $(R'O)_2$—B—R, where R and R' are alkyl. More accurately, these should be named as alkyl boronic acid or as boronate. Similarly, compounds of the formula HO—B—R$_2$ or R'O—B—R$_2$ should be named as borinic acid or borinate. It is understood that "borate" as used in the present specifications includes the boronates and borinates, as well as the borates, the latter having the formula $(R'O)_3$—B where one or more of R' are derived from the alkanol amines herein set forth.

The second compound of the synergistic mixture of the present invention is an N-hydroxyphenyl-benzotriazole. The N-hydroxyphenol-benzotriazole may be illustrated by the following general formula:

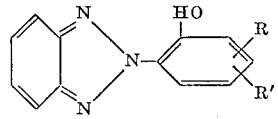

where R and R' are independently selected from hydrogen, alkyl of from 1 to 20 carbon atoms and alkoxy of from 1 to 20 carbon atoms.

Where R is alkyl and R' is hydrogen illustrative compounds include 2 - (2'-hydroxy-5'-methylphenyl)-benzotriazole and corresponding compounds in which the methyl group is replaced by ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl. Additional examples of specific compounds include 2-(2'-hydroxy-5'-octylphenyl)-benzotriazole and 2 - (2'-hydroxy-5'-dodecylphenyl)-benzotriazole. Other illustrative compounds include 2-(2'-hydroxy-4'-methylphenyl)-benzotriazole and corresponding compounds in which the methyl group is replaced by an alkyl group of from 2 to 20 carbon atoms. Other compounds include those in which the alkyl group is in the 3' or 6' position.

Where both R and R' are alkyl, illustrative compounds include 2 - (2' - hydroxy-3',5'-dimethylphenyl)-benzotriazole and corresponding compounds in which one or both of the alkyl groups are replaced by alkyl groups containing from 2 to 20 carbon atoms. Here again it is understood that the alkyl groups may be in the positions 3',4'; 3',6'; 4',5' or 4',6'.

Where R is alkoxy and R' is hydrogen, illustrative compounds include 2-(2'-hydroxy-4'-methoxyphenyl)-benzotriazole and corresponding compounds in which the methoxy group is replaced by an alkoxy group containing from 2 to 20 carbon atoms. Additional examples of specific compounds include 2-(2'-hydroxy-5'-octoxyphenyl)-benzotriazole and 2-(2'-hydroxy-5'-dodecoxyphenyl)-benzotriazole. Here again, the alkoxy group may be in the 3', 5' or 6' position.

Where R is alkyl and R' is alkoxy, illustrative compounds include 2-(2'-hydroxy-3'-methoxy-4'-methylphenyl)-benzotriazole,
2-(2'-hydroxy-3'-methoxy-4'-ethylphenyl)-benzotriazole,
2-(2'-hydroxy-3'-methoxy-4'-propylphenyl)-benzotriazole,
2-(2'-hydroxy-3'-methoxy-4'-tert-butylphenyl)-benzotriazole,
2-(2'-hydroxy-3'-methoxy-4'-tert-pentylphenyl)-benzotriazole,
2-(2'-hydroxy-3'-methoxy-4'-tert-hexylphenyl)-benzotriazole,
2-(2'-hydroxy-3'-methoxy-4'-tert-heptylphenyl)-benzotriazole,
2-(2'-hydroxy-3'-methoxy-4'-tert-octylphenyl)-benzotriazole,
2-(2'-hydroxy-3'-methoxy-4'-tert-nonylphenyl)-benzotriazole,
2-(2'-hydroxy-3'-methoxy-4'-tert-decylphenyl)-benzotriazole,
2-(2'-hydroxy-3'-methoxy-4'-tert-undecylphenyl)-benzotrizole,
2-(2'-hydroxy-3'-methoxy-4'-tert-dodecylphenyl)-benzotriazole, corresponding compounds in which the methoxy is replaced by alkoxy containing 2 to 20 carbon atoms, corresponding compounds in which the tert-alkyl groups are normal alkyl or secondary alkyl, corresponding compounds in which the alkyl and alkoxy groups, respectively, are in the positions 3',5'; 3',6'; 4',5'; 4',6'; 4',3'; 5',3'; 5',4'; 6',3'; 6',4'; or 6',5'.

From the above description, it will be seen that various N-hydroxyphenyl-benzotriazoles may be used in the synergistic mixture of the present invention. The N-hydroxyphenyl-benzotriazoles generally are available in the open market or may be prepared by conventional means. It is understood that the different N-hydroxyphenyl-benzotriazoles are not necessarily equivalent in their effectiveness in the mixture of the present invention.

As hereinbefore set forth, the synergistic mixture of the present invention also may contain one or more additional antioxidants and more particularly at least one phenolic antioxidant. In one embodiment, the additional antioxidant is a trialkylphenol. A particularly preferred trialkylphenol is 2,6-di-tert-butyl-4-methylphenol. Other trialkylphenols include 2,6-di-isopropyl-4-methylphenol,
2,6-diamyl-4-methylphenol,
2,6-dihexyl-4-methylphenol,
2,6-diheptyl-4-methylphenol,
2,6-dioctyl-4-methylphenol,
2,6-dinonyl-4-methylphenol,
2,6-didecyl-4-methylphenol,
2,6-diundecyl-4-alkylphenol,
2,6-didodecyl-4-alkylphenol,
2,6-ditridecyl-4-alkylphenol,
2,6-ditetradecyl-4-alkylphenol,
2,6-dipentadecyl-4-alkylphenol,
2,6-dihexadecyl-4-alkylphenol,
2,6-diheptadecyl-4-alkylphenol,
2,6-dioctadecyl-4-alkylphenol, etc.,
2,4-dimethyl-6-isopropylphenol,
2,4-dimethyl-6-tert-butylphenol,
2,4-dimethyl-6-pentylphenol,
2,4-dimethyl-6-hexylphenol,
2,4-dimethyl-6-heptylphenol,
2,4-dimethyl-6-octylphenol,
2,4-dimethyl-6-nonylphenol,
2,4-dimethyl-6-decylphenol, etc.,
2,6-diethyl-4-alkylphenol,
2,6-dipropyl-4-alkylphenol,
2,6-dibutyl-4-alkylphenol,
2,6-diamyl-4-alkylphenol,
2,6-dihexyl-4-alkylphenol, etc., in which the alkyl contains from 1 to 20 or more carbon atoms. In one embodiment, the trialkylphenol will contain one or two alkyl groups containing four or less carbon atoms and one or two alkyl groups containing four or more carbon atoms, the latter preferably being of tertiary configuration. These trialkylphenols may be obtained in the open market or prepared in any suitable manner. Here again, it is understood that the different trialkylphenols are not necessarily equivalent in their use in the antioxidant mixture of the present invention.

In another embodiment, the additional antioxidant is 1,1,3 - tris - (2-methyl-4-hydroxy-5-tert-butylphenyl)-butane. This material is available commercially under the trade name of "Topanol CA." Other related antioxidant compounds may be used and includes, for example, those in which the methyl group is replaced by hydrogen or alkyl of 2 to 6 carbon atoms and/or those in which the tert-butyl group is replaced by tert-pentyl, tert-hexyl, tert-heptyl, tert-octyl, tert-nonyl, tert-decyl and/or related compounds in which the butane moiety is replaced by pentane, hexane, heptane, octane, nonane, decane, etc. In another embodiment, this component of the mixture is 2,4-bis-(3,5-di-tert-butyl - 4 - hydroxyphenyl)-butane. Here again, it is understood that the tert-butyl and/or butane moiety may be replaced by other alkyl groups. These compounds may be obtained in the open market or prepared in any suitable manner.

In another embodiment, the additional antioxidant is dilauryl-thiodipropionate. This compound is available commercially or may be prepared in any suitable manner. It is understood that other satisfactory antioxidants may be used and these include, for example, dicapryl-thiodipropionate, dimyristyl-thiodipropionate, dipalmityl-thiodipropionate, distearyl-thiodipropionate, etc. Still other antioxidants include dilauryl-beta-mercapto-dithiopropionate, distearyl-beta-mercapto-dithiopropionate, and other beta-mercapto-dithiopropionates.

In a particularly preferred embodiment the additional antioxidant comprises both the 1,1,3-tris-(2-methyl-4-hydroxy-5-tert-butylphenyl)-butane and dilauryl-thiodipropionate. Here again it is understood that a mixture of the corresponding compounds hereinbefore set forth may be used.

In still another embodiment one or more additional additives may be included in the synergistic mixture or used in conjunction with the synergistic mixture. The use of such additional additives generally will depend upon the particular substrate being stabilized. For example, in lubricating oil the additional additives may comprise one or more of viscosity index improver, pour point depressant, detergent, corrosion inhibitor, additional antioxidant, etc. Such additional additives may be one or more of 2 - tert - butyl - 4-methoxyphenol, 2-tert-butyl-4-ethoxyphenol, 3,3',5,5',tetra-tert-butyl-diphenylmethane, etc. In plastics, other additives include phenyl-alpha-naphthylamine, phenyl - beta - naphthylamine, phenothiazine, diphenyl-p-phenylenediamine, 2,2'-methylene-bis-(4-methyl-6 - tert - butylphenol), 2,2' - methylene-bis-(4-ethyl-6-tert-butylphenol), 4,4'-thio-bis-(6-tert-butyl-o-cresol), 2,6-bis-(2' - hydroxy - 3' - tert-butyl-5'-methylbenzyl)-4-methylphenol, p-octylphenyl salicylate, nickel-bis-dithiocarbamate. Still other additives include various Irganoxes, such as 5,691,093, 1,076,858, etc., various Ionoxes such as 1,3,5 - trimethyl - 2,4,6-tris-(3,5-di-tert-butyl-4-hydroxybenzyl)-benzene, etc., various Plastanoxes such as 2,6-bis-(2' - hydroxy - 3' - tert-butyl-5'-methylbenzyl)-4-methylphenol, various phosgene alkylphenol reaction products, various alkoxyalkyldihydroxybenzophenones, polyalkyldihydroxybenzophenones, tetrahydroxybenzophenones, 2,4,5-trihydroxybutyrophenone, 2,4-dibenzoylresorcinol and especially such hydroxybenzophenones as 2,2'-dihydroxy-4 - octoxybenzophenone, 2,2' - dihydroxy-4-decoxybenzophenone, 2,2'-dihydroxy-4-dedocoxybenzophenone, 2,2'-dihydroxy - 4 - octadecoxybenzophenone, 2 - hydroxy-4'-octoxybenzophenone, 2-hydroxy-4'-decoxybenzophenone, 2 - hydroxy - 4-'-dodecoxybenzophenone, 5-chloro-2-hydroxybenzophenone, 2 - hydroxy-4-methoxy-2'-carboxybenzophenone, 2 - hydroxy - 4 - methoxy - 5 - sulfobenzophenone, etc., and in general any alkyl, alkoxy or cycloalkoxy substituted 2-hydroxybenzophenone.

The synergistic mixture will comprise from about 10% to about 90% by weight of the borate of the alkanolamine or of the polyalkylpolyhydroxyalkyl alkylenepolyamine and from about 10% to about 90% by weight of the N-hydroxyphenyl-benzotriazole. In a particularly preferred embodiment the borate will comprise from about 50% to about 90% by weight and the N-hydroxyphenyl-benzotriazole will comprise from about 10% to about 50% by weight of the mixture. When employed, the additional antioxidant or antioxidants will be used in a total concentration of from about 1% to about 50% by weight of the synergistic mixture of borate and N-hydoxyphenyl-benzotriazole.

The synergistic mixture will be used in a stabilizing concentration and in general will be within the range of from about 0.001% to about 10% and more particularly from about 0.01% to about 2% by weight of the substrate.

As hereinbefore set forth, the synergistic mixture of the present invention is advantageously used as an additive to retard both ultraviolet light and oxidative deterioration. In one embodiment, this mixture is used in solid polymers including plastics and resins. Illustrative plastics include polyolefins and particularly polyethylene, polypropylene, polybutylene, mixed ethylene propylene polymers, mixed ethylene butylene polymers, mixed propylene butylene polymers, mixed styrene ethylene polymers, mixed styrene propylene polymers, etc. The solid olefin polymers are used in many applications including electrical insulation, lightweight outdoor furniture, awnings, cover for greenhouses, etc.

In another embodiment, the polymers include those prepared from diolefinic monomers as, for example, polybutadiene, or those in which the diolefin or diolefins are reacted with monoolefin or monoolefins, including ABS (acrylonitrilebutadiene-styrene polymers).

Another plastic being used commercially on a large scale is polystyrene. The polystyrenes are particularly useful in the manufacture of molded or machined articles which find application in such goods as windows, optical goods, automobile panels, molded household articles, etc.

Another class of plastics available commercially is broadly classed as vinyl resins and is derived from monomers such as vinyl acetate, vinylbutyrate, etc. Other vinyl type resins include polyvinyl alcohol and co-polymers, copolymers of vinyl chloride with acrylonitrile, methacrylonitrile, alkyl acrylates, alkyl methacrylates, alkyl maleates, alkyl fumarates, polyvinyl butyral, etc., or mixtures thereof.

Other plastics being used commercially on a large scale are in the textile class and include nylon (polyamide), erlon L or 6-nylon (polyamide), Dacron (terephthalic acid and ethylene glycol), Orlon (polyacrylonitrile), Dynel (copolymer of acrylonitrile and vinyl chloride), Acrilan (polyacrylonitrile modified with vinyl acetate), rayon, etc.

Still other plastics are prepared from other monomers and are available commercially. Illustrative examples of such other solid polymers include polycarbonates, phenol-formaldehyde resins, urea-formaldehyde resins, melamine-formaldehyde resins, acryloid plastics which are derived from methyl, ethyl and higher alkyl acrylates and methacrylates as monomers used in the polymerization. Other polymers include polyacetals, especially polyformaldehydes such as "Delrin" and "Celcon." Still other substrates include vinyl, acrylic, nitrocellulose based coatings; especially cellulose acetate, cellulose acetate butyrate, ethyl cellulose, etc. Still other substrates are polyesters, including linear or cross-linked, reinforced polyesters, laminate polyesters, etc., polyurethane resins, epoxy resins, various latexes, lacquers, alkyds, varnishes, polishes, stains, pigments, dyes, textile finishing formulations, etc.

It is understood that the plastic or resin may be fabricated into any desired finished product including moldings, castings, fibers, films, sheets, rods, tubing, foams or other shapes.

Another organic substrate which undergoes deterioration due to oxidation and/or weathering is rubber. Rubber is composed of polymers of conjugated 1,3-dienes, either as polymers thereof or as copolymers thereof with other polymerizable compounds, and may be synthetically prepared or of natural origin. Synthetic rubbers include SBR rubber (copolymer of butadiene and styrene), EPR rubber (terpolymer of ethylene, propylene and a diene), Buna A (copolymer of butadiene and acrylonitrile), butyl rubber (copolymer of butadiene and isobutylene), Thiokol rubber (polysulfide), silicone rubber, etc. Natural rubbers include hevea rubber, cautchouc, balata, gutta percha, etc.

Still other organic substrates which undergo deterioration due to oxidation and/or weathering include paints, varnishes, drying oils, pigments, rust preventative coatings, other protective coatings, etc.

Still other organic substartes which undergo oxidative deterioration comprise hydrocarbon oils including gasoline, naphtha, kerosene, solvents, fuel oil, diesel oil, lubricating oil, etc. The lubricating oil may be of natural origin and includes mineral oils generally referred to as motor lubricating oil, railroad type lubricating oil, marine oil, transformer oil, turbine oil, differential oil, diesel lubricating oil, gear oil, cylinder oil, specialty products oil, cutting oil, rolling oil, drawing oil, soluble oil, etc. Other natural oils include those of animal, marine or vegetable origin.

The lubricating oil may be synthetic and of varied types including aliphatic esters, polyalkylene oxides, silicones, esters of phosphoric and silicic acids, highly fluorine-substituted hydrocarbons, etc. Of the aliphatic esters, di-(2-ethylhexyl) sebacate is being used on a comparatively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethylhexyl) azelate, di-3,5,5-trimethylhexyl glutarate, di-3,5,5-trimethylpentyl glutarate, di-(2 - ethylhexyl) pimelate, di-(2 - ethylhexyl) adipate, triamyl tricarballylate, pentaerythritol tetracaproate, dipropylene glycol dipelargonate, 1,5-pentane-diol-di-(2-ethylhexanonate), etc. The polyalkylene oxides include polyisopropylene oxide, polyisopropylene oxide diether, polyisopropylene oxide diester, etc. The silicones include methyl silicone, methylphenyl silicone, etc., and the silicates include, for example, tetraisooctyl silicate, etc. The highly fluorinated hydrocarbons include fluorinated oil, perfluorohydrocarbons, etc.

Additional synthetic lubricating oils include (1) neopentyl glycol esters in which the ester group contains from three to twelve carbon atoms or more, and particularly neopentyl glycol propionates, neopentyl glycol butyrates, neopentyl glycol caproates, neopentyl glycol caprylates, neopentyl glycol pelargonates, etc., (2) trimethylol alkane esters such as the esters of trimethylol ethane, trimethylol propane, trimethylol butane, trimethylol pentane, trimethylol hexane, trimethylol heptane, trimethylol octane, trimethylol decane, trimethylol undecane, trimethylol dodecane, etc., and particularly triesters in which the ester portions each contain from three to twelve carbon atoms and may be selected from those hereinbefore specifically set forth in connection with the discussion of the neopentyl glycol esters, (3) complex esters composed of dibasic acids and glycols, especially neopentyl, neohexyl, etc., glycols further reacted or capped with monobasic acids or alcohols to give lubricants of viscosities at 210° F. of from 4 to 12 centistokes or higher, and (4) tricresylphosphate, trioctylphosphate, trinonylphosphate, tridecylphosphate, as well as mixed aryl and alkyl phosphates, etc.

The present invention also is used in greases made by compositing one or more thickening agents with an oil of natural or synthetic origin. Metal base synthetic greases are further classified as lithium grease, sodium grease, calcium grease, barium grease, strontium grease, aluminum grease, etc. These greases are solid or semi-solid gels and, in general, are prepared by the addition to the lubricating oil of hydrocarbon soluble metal soaps or salts of higher fatty acids as, for example, lithium stearate, calcium stearate, aluminum naphthenate, etc. The grease may contain one or more thickening agents such as silica, carbon black, talc, organic modified Bentonite, etc., polyacrylates, amides, polyamides, aryl ureas, methyl N-n-octadecyl terephthalomate, etc. Another type of grease is prepared from oxidized petroleum wax, to which the saponifiable base is combined with the proper amount of the desired saponifying agent, and the resultant mixture is processed to produce a grease. Other types of greases in which the features of the present invention are usable include petroleum greases, whale grease, wool grease, etc., and those made from inedible fats, tallow, butcher's waste, etc.

Oils of lubricating viscosity also are used as slushing oils. The slushing oils are employed to protect finished or unfinished metal articles during storage or transportation from one area to another. The metal articles may be of any shape or form including steel sheets, plates, panels, coils, bars, etc., which may comprise machine parts, engines, drums, piston rings, light arms, etc., as well as farm machinery, marine equipment, parts for military or other vehicles, household equipment, factory equipment, etc. A coating which may be visible to the eye, or not, as desired, covers the metal part and protects it from corrosion, etc.

The components of the antioxidant mixture of the present invention may be added separately to the organic substrate to be stabilized, preferably with intimate mixing in order to obtain uniform distribution throughout the substrate. Preferably, the synergisitic mixture is first formed by commingling the components, with or without other additives, and then adding the mixture to the substrate to be stabilized. When desired, the mixture or the individual components may be utilized as such or prepared as a solution in a suitable solvent.

The following examples are introduced to illustrate further the novelty and utility of the present invention but not with the intention of unduly limiting the same.

Example I

The borate of N,N-dicyclohexyl-ethanolamine was prepared by the reaction of 3 mole proportions of N,N-dicyclohexylethanolamine with 1 mole proportion of boric acid. Specifically 68.4 g. (0.3 mole) of N,N-di-cyclohexylethanolamine and 6.18 g. (0.1 mole) of boric acid were refluxed in the presence of 100 g. of benzene at a temperature of about 85° C. The heating and refluxing was continued until a total of 5 cc. of water was collected. Following completion of the reaction, the benzene was removed by vacuum distillation at a temperature of about 170° C. at 0.4 mm. Hg. The product was recovered as a liquid, having a basic nitrogen content of 4.29 meq./g., an acid value of 0.008 meq./g. and a boron content of 1.42% by weight. This corresponds to the theoretical boron content of 1.58% by weight for the compound tris-(N,N-dicyclohexyl-ethoxy) borate having the formula:

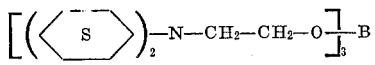

A synergistic mixture is prepared by comingling 100 pounds of the borate prepared in the above manner with 100 pounds of 2-(2' - hydroxy-5'-methylphenyl)-benzotriazole, the latter being commercially available as "Tinuvin P."

Example II

Another synergistic mixture is prepared by comingling 20 pounds of 2,6-di-tert-butyl-4-methylphenyl with the mixture prepared in accordance with Example I.

Example III

Another synergistic mixture is prepared by comingling 100 pounds of the borate of N,N-di-cyclohexyl-ethanolamine prepared as described in Example I, 100 pounds of "Tinuvin P," 80 pounds of 1,1,3-tris-(2-methyl-4-hydroxy-5 - tert-butylphenyl)butane, available commercially as "Topanol CA," and 160 pounds of diluaryl-thiodipropionate.

Example IV

Another synergistic mixture is prepared in the same manner as described in Example I except that the N-hydroxyphenyl-benzotriazole used in this example is available commercially as "Tinuvin 327" 2-(2'-hydroxy, chloro, tert-butylphenyl)-tert-butyl-benzotriazole.

Example V

Another synergistic mixture is prepared in the same manner as described in Example II except that the N-hydroxy-penyl-benzotriazole is available commercially as "Tinuvin 327."

Example VI

Another synergistic mixture is prepared in the same manner as described in Example III except that the N-hydroxy-phenyl-benzotriazole is available commercially as "Tinuvin 327."

Example VII

The borate of N,N-dicyclohexyl-ethanolamine also was prepared by the reaction of N,N-dicyclohexyl-ethanolamine and nonyl boronic acid. Specifically, 22.5 g. (0.1 mole) of N,N-dicyclohexyl-ethanolamine and 8.59 g. (0.05 mole) of nonyl boronic acid were heated and refluxed in the presence of 50 g. of benzene. A total of 1.4 cc. of water was collected. The product was vacuum distilled at a temperature of 115° C. and 18 mm. Hg. The product is believed to be the N,N-di-cyclohexyl-aminoethyl diester of nonyl boronic acid and may be named as a boronate. 1.71% by weight of boron was found on analysis.

A synergistic mixture is prepared by commingling 50 pounds of the boronate prepared in the above manner with 40 pounds of 2-(2'-hydroxy-4'-methoxyphenyl)-benzotriazole.

Example VIII

The borinate of N,N-dicyclohexyl-ethanolamine is prepared by reacting 1 mole proportion of N,N-dicyclohexylethanolamine with 1 mole proportion of dinonyl borinic acid by heating and refluxing the reactants in benzene solvent at a temperature of about 85° C. until the theoretical amount of water is collected, after which the benzene solvent is removed by vacuum distillation.

A synergistic mixture is prepared by commingling 50 pounds of the borinate prepared in the above manner with 50 pounds of "Tinuvin P," 5 pounds of "Topanol CA" and 7.5 pounds of dimyristyl-thiodipropionate.

Example IX

The borate of N,N-di-sec-octyl-ethanolamine was prepared by heating and refluxing 33.7 g. (0.118 mole) of N,N-di-(1-methylheptyl) - ethanolamine and 2.43 g. (0.039 mole) of boric acid in 100 g. of benzene at a temperature of about 85° C. Following completion of the reaction and removal of the benzene by vacuum distillation at 145° C. and 18 mm. Hg, the product was recovered as a liquid having a boron content of 1.30% by weight. This corresponds to a theoretical boron content of 1.25% by weight for the triester of the reaction of 3 mole proportions of the N,-di-sec-octyl-ethanolamine with 1 mole proportion of boric acid, and may be illustrated by the formula:

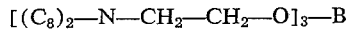

A synergistic mixture is prepared by commingling 100 pounds of the borate prepared in the above mannner with 100 pounds of "Tinuvin 327."

Example X

Another synergistic mixture is prepared by commingling 80 pounds of "Topanol CA" and 160 pounds of dilauryl-thiodipropionate with the mixture prepared as described in Example IX.

Example XI

The borate of this example is prepared by the reaction of equal mole proportions of $N^1,N^3$-di-sec-octyl-$N^1,N^2,N^3$-tri-(2-hydroxyethyl) - diethylenetriamine and boric acid. The $N^1,N^3$-di-sec-octyl-$N^1,N^2,N^3$-tri-(2-hydroxyethyl)-diethylenetriamine is prepared by reacting 1 mole proportion of $N^1,N^3$-bis-(1-ethyl - 3 - methylpentyl)-diethylenetriamine with 3 mole proportions of ethylene oxide in a turbomixer at a temperature of about 100° C. for about 4 hours. $N^1,N^3$-di-sec-octyl-$N^1,N^2,N^3$-tri-(2-hydroxyethyl)-diethylenetriamine is recovered as a light colored liquid having a boiling point of 233–235° C. at 0.5 mm. Hg, a basic nitrogen content of 6.58 meq./g. and a hydroxyl content by acylation method of 5.75 meq./g.

The reaction of the $N^1,N^3$-di-sec-octyl-$N^1,N^2,N^3$-tri-(2-hydroxyethyl)-diethylenetriamine and boric acid is effected by heating and refluxing the mixture in the presence of benzene solvent until the theoretical amount of water is collected. Following completion of the reaction, the reaction product is distilled under vacuum to remove benzene solvent and to recover the borylated product as a liquid.

A synergistic antioxidant mixture is prepared by commingling 50 pounds of the borate prepared in the above manner with 50 pounds of "Tinuvin P."

Example XII

Another synergistic mixture is prepared by commingling 10 pounds of 2,6-di-tert-butyl-4-methylphenol with the mixture prepared in accordance with Example XI.

Example XIII

The borate of this example is prepared by the reaction of equal mole proportions of N,N'-dicyclohexyl-N,N'-di-(2-hydroxyethyl)-ethylenediamine and boric acid. The reaction is effected under refluxing conditions at a temperature of about 130° C. in the presence of xylene solvent.

A synergistic mixture is prepared by commingling 100 pounds of the borate prepared as described above with 100 pounds of "Tinuvin 327."

Example XIV

This example demonstrates the synergistic effect obtained by the mixture of the present invention. Different additives were incorporated in a commercial solid polypropylene which was obtained free of inhibitor. The samples were prepared as dumbbell specimens and subjected to exposure outdoors. About 14 different dumbbell specimens of each sample were prepared and these were displayed on a rack at a 45° angle facing South at Des Plaines, Ill. Periodically a dumbbell specimen of each sample is removed from the rack and evaluated for percent elongation.

All but one set of samples in the following evaluations were placed outdoors in the middle of June. The other set of samples was placed outdoors at the end of March of the same year. This is important because during the summer months, the rays of the sun are most severe and accordingly most damaging. Lesser deterioration occurs during the late fall, winter and early spring months.

The control sample, without additive, had an initial elongation of 536%. After 26 days outdoors, the elongation dropped to 7%. This demonstrates that the control sample had deteriorated rapidly.

Another set of samples was prepared to contain 1% by weight of the borate of N,N-di-cyclohexyl-ethanolamine, prepared as described in Example I, and 0.15% by weight of 2,6-di-tert-butyl-4-methylphenol. These specimens were placed outdoors on June 4th and, after 42 days, the elongation was 393%. This shows considerable improvement as compared to the control sample.

Another set of samples was prepared to contain 1% by weight of "Tinuvin 326" 2-(2'-hydroxy, chloro, methylphenyl)-tert-butyl-benzotriazole and 0.15% by weight of 2,6-di-tert-butyl-4-methylphenol. After 42 days of exposure outdoors, the elongation was 111% and after 348 days the elongation was down to 14%. While these results are better than the control sample, the improvement is not sufficient to warrant its use commercially.

Still another set of samples was prepared to contain 1% by weight of the borate of N,N-di-cyclohexyl-ethanolamine, prepared as described in Example I, 0.5% by weight of "Tinuvin 326" and 0.15% by weight of 2,6-di-tert-butyl-4-methylphenol. As stated above, the previously described samples were placed outdoors in the middle of June. However, this set of samples was placed outdoors near the end of March of the same year. After 126 days, the elongation was 311%. After 433 days, the elongation was 187%. The last of the 14 dumbbell specimens was allowed to remain outdoors for 1345 days (about 2⅔ years) and the sample still is not brittle. This is the last specimen of this sample and, therefore, it was decided not to subject it to breaking in order to determine the specific percent elongation but to check its brittleness by hand stretching. However, this demonstrates a most startling stabilization of the polypropylene.

Example XV

As hereinbefore set forth, the synergistic mixture of the present invention may be used in admixture with additional antioxidants. In these evaluations dumbbell specimens of the different samples were subjected to exposure in the Fadometer and the yield values were determined periodically.

A control sample (without additive) of the polypropylene decreased in yield value from an initial of about 4700 p.s.i. to 550 p.s.i. after only 120 hours of exposure in the Fadometer.

Another sample of the polypropylene containing 0.25% by weight of "Tinuvin 327" had a yield value of only 876 p.s.i. after 480 hours in the Fadometer.

In contrast, another sample of the polypropylene containing 0.125% by weight of the borate of N,N-di-cyclohexylethanolamine, prepared as described in Example I, 0.125% by weight of "Tinuvin 327," 0.1% by weight of "Topanol CA" and 0.2% by weight of dilauryl-thiodipropinate. The sample of polypropylene containing this mixture had a yield value of 1320 p.s.i. after 1440 hours of exposure in the Fadometer.

Apparently there is a further synergistic effect in the above mixture because another sample of the polypropylene containing 0.1% by weight of "Topanol CA" and 0.2% by weight of diluaryl-thiodipropionate had a yield value of 980 p.s.i. after only 360 hours of exposure in the Fadometer.

Example XVI

This example demonstrates the antioxidant properties of the synergistic mixture of the present invention. The antioxidant properties were determined by incorporating the additive into samples of the polypropylene by milling. The samples of the polypropylene were evaluated in a method similar to that described by Hawkins, Hansen, Matreyek and Winslow in Rubber Chemistry and Technology, October-November, 1959, pages 1164–1170, except that an electrically heated aluminum block rather than an oven was used to maintain the desired temperature. The oxygen absorption of the sample was determined manometrically rather than volumetrically. In this method samples of the polypropylene, weighing about 0.5 gram each, are placed in separate 8 mm. glass tubes and the tubes then are inserted into horizontal rows of openings located concentrically around the heater. The temperature is maintained at about 140° C. The glass tubing also is packed with glass wool and molecular sieves to absorb the gases. Each of the glass tubes is connected to an individual manometer containing mercury, and the differential presure is periodically determined. The Induction Period is taken as the number of hours required to reach a pressure differential of 20 cm. Hg.

When evaluated in the above manner, the control sample (not containing the additive) of the polypropylene had an Induction Period of less than 2 hours.

Another sample of the polypropylene containing 0.25% by weight of the borate of N,N-di-cyclohexyl-ethanolamine, prepared as described in Example I had an Induction Period of about 34 hours.

Another sample of the polypropylene containing 0.25% by weight of "Tinuvin 327" had an Induction Period of about 1 hour.

In contrast to the above, another sample of the polypropylene containing 0.125% by weight of the borate of N,N-di-cyclohexyl-ethanolamine, prepared as described in Example I, 0.125% by weight of "Tinuvin 327," 0.1% by weight of "Topanol CA" and 0.2% by weight of dilauryl-thiodipropionate had an Induction Period of greater than 2586 hours. This extremely high Induction Period demonstrates the high synergistic properties of the mixture of the present invention.

Example XVII

The synergistic mixture prepared as described in Example III is incorporated in a concentration of 0.75% by weight of total additive in solid polyethylene of the high density type. An inhibitor product of this polyethylene is marketed commercially under the tradename of "Fortiflex." The synergistic mixture is incorporated in the polyethylene during milling thereof and serves to decrease deterioration of the polyethylene due to weathering.

Example XVIII

The synergistic mixture prepared as described in Example II is used in a concentration of 1% by weight in polystyrene. The synergistic mixture is incorporated in the polystyrene during milling thereof and this serves to inhibit deterioration of the polystyrene due to ultraviolet light absorption and oxidative reactions.

Example XIX

The synergistic mixture prepared as described in Example VI is used in a concentration of 1% by weight in ABS resin. Oven aging at 140° C. does not cause discoloration due to oxidation.

Example XX

This example describes the use of the synergistic mixture of the present invention in synthetic lubricating oil. The synthetic lubricating oil is dioctyl-sebacate and is marketed under the tradename of "Plexol." The synergistic mixture comprises 60% by weight of the borate of N,N-di-cyclohexyl-propanolamine and 40% by weight of "Tinuvin P." The synergistic mixture is incorporated in a concentration of 2% by weight in synthetic lubricating oil with intimate mixing.

Example XXI

This example describes the use of the synergistic mixture of the present invention in grease. In this example, the synergistic mixture comprises 75% by weight of the borate of N,N-di-sec-octyl-ethanolamine, prepared as described in Example IX, and 25% by weight of "Tinuvin P." This mixture is incorporated in a concentration of 0.3% by weight in a commercial Mid-Continent lubricating oil having an S.A.E. viscosity of 20. Approximately 92% of the lubricating oil then is mixed with approximately 8% by weight of lithium stearate. The mixture is heated to 230° C., with constant agitation. Subsequently, the grease is cooled, while agitating, to approximately 120° C., and then the grease is further cooled slowly to room temperature.

The stability of the grease is tested in accordance with ASTM D-942 method, in which method a sample of the grease is placed in a bomb and maintained at a temperature of 121° C. Oxygen is charged to the bomb, and the time required for a drop of five pounds pressure is taken as the Induction Period. A sample of the grease without additive will reach the Induction Period within 4 hours. A sample of the grease containing 0.3% by weight of the synergistic mixture of the present invention will not reach the Induction Period until more than 100 hours when evaluated in the above manner.

I claim as my invention:

1. Synergistic mixture of about 10% to about 90% by weight of a boron ester of N,N-dihydrocarbyl-alkanolamine or boron ester of polyalkyl- or polycycloalkyl- polyhydroxyalkyl-alkylenepolyamine and about 10% to about 90% by weight of an N-hydroxyphenyl-benzotriazole.

2. The mixture of claim 1 wherein the borate is a borate of a compound of the following formula:

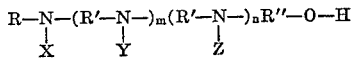

where R is hydrocarbyl, R' is alkylene, R'' is alkylene, X is hydrocarbyl when $m$ and $n$ are zero or hydroxyalkyl when $m$ is one or more and/or $n$ is one, Y is hydrocarbyl when $m$ is one and $n$ is zero or hydroxyalkyl when $m$ is more than one and $n$ is one, Z is hydrocarbyl, $m$ is an integer of zero to 4 and $n$ is zero or one.

3. The mixture of claim 1 wherein said alkanolamine is N,N-di-cycloalkyl-alkanolamine.

4. The mixture of claim 3 wherein said alkanolamine is N,N-di-cyclohexyl-alkanolamine.

5. The mixture of claim 1 wherein said alkanolamine is N,N-di-sec-alkyl-alkanolamine containing from 3 to 50 carbon atoms in each alkyl and 2 to 8 carbon atoms in the alkanol moiety.

6. The mixture of claim 5 wherein said alkanolamine is N,N-di-sec-octyl-ethanolamine.

7. The mixture of claim 1 wherein said polyalkylpolyhydroxyalkyl-alkylenepolyamine is N,N'-dialkyl-N,N'-dihydroxyalkyl-alkylenediamine.

8. The mixture of claim 7 wherein said polyalkylpolyhydroxyalkyl-alkylenepolyamine is N,N'-di-sec-octyl-N,N'-di-(2-hydroxyethyl)-ethylenediamine.

9. The mixture of claim 1 wherein said N-hydroxyphenyl-benzotriazole is 2-(2'-hydroxy-5'-methylphenyl)-benzotriazole.

10. The mixture of claim 1 wherein said N-hydroxyphenyl-benzotriazole is 2-(2'-hydroxy-4'-methoxyphenyl)-benzotriazole.

11. The mixture of claim 1 also containing an additional phenolic antioxidant selected from the group consisting of trialkyl phenol and poly-(hydroxyphenyl)-alkane.

12. The mixture of claim 11 wherein said additional antioxidant is from about 1% to about 50% by weight of the mixture of trialkylphenol.

13. The mixture of claim 12 wherein said trialkylphenol is 2,6-di-tert-butyl-4-methylphenol.

14. The mixture of claim 1 also containing from about 1% to about 50% by weight of 1,1,3-tris-(2-methyl-4-hydroxy-5-tert-butylphenyl)-butane.

15. The mixture of claim 1 also containing from about 1% to about 50% by weight of dilauryl-thiodipropionate.

16. The mixture of claim 1 also containing a total of from about 1% to about 50% by weight of 1,1,3-tris-(2-methyl-4-hydroxy-5-tert-butylphenyl)-butane and dilauryl-thiodipropionate.

17. The mixture of claim 1 used as an additive in lubricating oil normally subject to ultraviolet light or oxidative deterioration.

18. The mixture of claim 1 used as an additive in grease normally subject to ultraviolet light or oxidative deterioration.

References Cited

UNITED STATES PATENTS

| | | | |
|---|---|---|---|
| 2,970,130 | 1/1961 | Finestone | 260—462 |
| 3,011,881 | 12/1961 | Emrick et al. | 260—462 |
| 3,227,739 | 1/1966 | Versteeg | 260—462 |
| 3,257,442 | 6/1966 | Woods et al. | 260—462 |

DANIEL E. WYMAN, Primary Examiner

Y. H. SMITH, Assistant Examiner

U.S. Cl. X.R.

252—49.6, 400; 44—63, 76